(12) United States Patent
Runyan et al.

(10) Patent No.: US 9,623,977 B2
(45) Date of Patent: Apr. 18, 2017

(54) HYBRID STRUCTURE INCLUDING BUILT-UP SANDWICH STRUCTURE AND MONOLITHIC SPF/DB STRUCTURE

(71) Applicant: The Boeing Company, Chicago, IL (US)

(72) Inventors: Max R. Runyan, Huntington Beach, CA (US); Daniel G. Sanders, Cle Elum, WA (US); Jack W. Mauldin, Mill Creek, CA (US); Brent C. Ludwig, Fife, WA (US); John M. Comfort, Corona, CA (US); Larry D. Hefti, Auburn, WA (US); Jason F. Joel, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 352 days.

(21) Appl. No.: 14/220,821

(22) Filed: Mar. 20, 2014

(65) Prior Publication Data

US 2015/0266586 A1 Sep. 24, 2015

(51) Int. Cl.

| | |
|---|---|
| *B64D 29/00* | (2006.01) |
| *B23K 20/02* | (2006.01) |
| *B32B 3/12* | (2006.01) |
| *B32B 15/01* | (2006.01) |
| *B32B 7/04* | (2006.01) |
| *B32B 15/14* | (2006.01) |
| *B32B 15/18* | (2006.01) |
| *F02K 1/82* | (2006.01) |

(52) U.S. Cl.
CPC .............. *B64D 29/00* (2013.01); *B23K 20/02* (2013.01); *B32B 3/12* (2013.01); *B32B 7/04* (2013.01); *B32B 15/01* (2013.01); *B32B 15/011* (2013.01); *B32B 15/013* (2013.01); *B32B 15/14* (2013.01); *B32B 15/18* (2013.01); *F02K 1/827* (2013.01); *B32B 2307/50* (2013.01); *B32B 2605/00* (2013.01); *B32B 2605/18* (2013.01); *F05D 2230/232* (2013.01); *F05D 2260/963* (2013.01); *Y02T 50/672* (2013.01); *Y10T 428/1234* (2015.01); *Y10T 428/1241* (2015.01); *Y10T 428/12389* (2015.01); *Y10T 428/12493* (2015.01)

(58) Field of Classification Search
None
See application file for complete search history.

(56) References Cited

U.S. PATENT DOCUMENTS

| | | | |
|---|---|---|---|
| 3,542,152 A * | 11/1970 | Oxx, Jr. ................. | B64D 33/02 181/214 |
| 3,927,817 A | 12/1975 | Hamilton et al. | |
| 4,217,397 A | 8/1980 | Hayase et al. | |
| 4,304,821 A | 12/1981 | Hayase et al. | |
| 4,495,237 A * | 1/1985 | Patterson ................. | B32B 3/28 156/291 |
| 4,522,859 A | 6/1985 | Blair | |
| 4,833,768 A | 5/1989 | Ecklund et al. | |
| 5,055,143 A | 10/1991 | Runyan et al. | |
| 5,330,092 A | 7/1994 | Gregg et al. | |

(Continued)

*Primary Examiner* — Adam Krupicka
(74) *Attorney, Agent, or Firm* — Miller, Matthias & Hull LLP

(57) ABSTRACT

A hybrid structure comprises a metallic built-up sandwich structure, and a monolithic superplastic formed and diffusion bonded structure joined to the built-up sandwich structure.

18 Claims, 7 Drawing Sheets

(56) References Cited

U.S. PATENT DOCUMENTS

| | | | |
|---|---|---|---|
| 5,715,644 A | 2/1998 | Yasui | |
| 6,983,912 B2 | 1/2006 | Connelly et al. | |
| 7,850,058 B2 | 12/2010 | Connelly et al. | |
| 7,927,686 B2 | 4/2011 | Zielinski et al. | |
| 7,943,227 B2 | 5/2011 | Connelly | |
| 2006/0210821 A1* | 9/2006 | Eilert | B29C 43/10 428/543 |
| 2006/0255098 A1* | 11/2006 | Runyan | B21D 26/055 228/112.1 |
| 2013/0251510 A1 | 9/2013 | Runyan et al. | |
| 2015/0041059 A1* | 2/2015 | Olson | F02K 1/56 156/308.6 |

* cited by examiner

HYBRID STRUCTURE INCLUDING BUILT-UP SANDWICH STRUCTURE AND MONOLITHIC SPF/DB STRUCTURE

BACKGROUND

A built-up sandwich panel may include a core that is sandwiched between two face sheets and resistance welded or brazed to the face sheets. A built-up sandwich panel made of titanium is light in weight and resistant to corrosion, it has higher strength than most metals, and it can survive extreme temperature environments. In addition, it may be treated for noise attenuation.

These features make titanium built-up sandwich panels desirable for aircraft structures such as jet engine nacelle inner walls.

SUMMARY

According to an embodiment herein, a hybrid structure comprises a metallic built-up sandwich structure, and a monolithic superplastic formed and diffusion bonded (SPF/DB) structure joined to the built-up sandwich structure.

According to another embodiment herein, an engine nacelle fan duct comprises an inner wall including a metallic built-up sandwich structure joined by a monolithic SPF/DB structure. The SPF/DB structure accommodates a bifurcation.

According to another embodiment herein, a method comprises constructing a hybrid structure with a metallic built-up sandwich structure except for portions having at least one of a forming radius of curvature of less than six inches, a complex contour, and reduced thickness. A monolithic SPF/DB structure is used for any of those portions.

These features and functions may be achieved independently in various embodiments or may be combined in other embodiments. Further details of the embodiments can be seen with reference to the following description and drawings.

DETAILED DESCRIPTION

A built-up metallic sandwich structure may include a core sandwiched between two face sheets that are welded or brazed together. As one example, the built-up sandwich structure may include at least one built-up sandwich panel having face sheets and a core of metallic ribbons that are resistance-welded or brazed between the face sheets. As used herein, the term "metallic" refers to metal (e.g., titanium, titanium alloys, corrosion resistant steel, Inconel alloys) and metal matrix composites (e.g., titanium and silicon carbide fibers).

The applicants have worked with planks of flat titanium resistance welded built-up sandwich panels and have been able to form these panels into gentle shapes having a constant width, a simple contour, and a forming radius of curvature that is greater than six inches. However, the applicants have had a problem forming these panels into shapes that have reduced width, or complex contours (e.g., circumferential compound, conical, cylindrical, single or multiple-dimensional curvature), or a tight forming radius of curvature (i.e., a radius of six inches or less). The applicants have found that panning down a titanium resistance-welded, built-up sandwich panel may crush welded core sheets and ribbons. In addition, forming complex contours from flat planks of titanium resistance welded sandwich panels may cause unacceptable wrinkling, buckling of face sheets, and disbonds between the face sheets and the ribbons.

Figure 1:
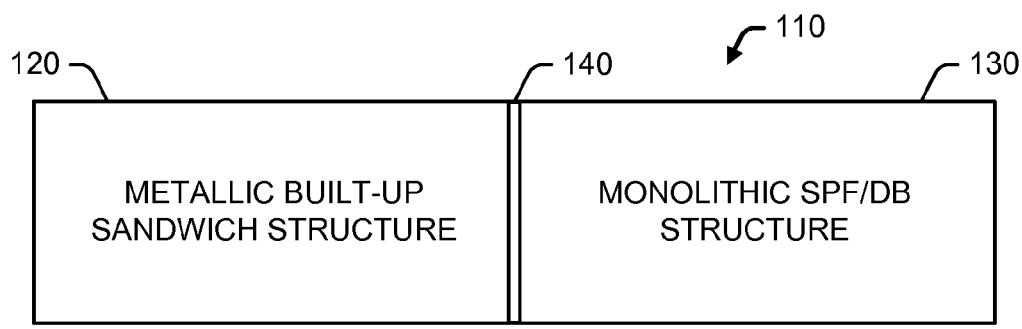
FIG. 1 is an illustration of a hybrid structure including a metallic built-up sandwich structure, and a monolithic SPF/DB structure joined to the built-up sandwich structure.

Reference is made to FIG. 1, which illustrates a hybrid structure 110 that overcomes these problems. The hybrid structure 110 includes a metallic built-up sandwich structure 120, and a monolithic superplastic formed and diffusion bonded (SPF/DB) structure 130 joined to the built-up sandwich structure 120.

Superplastic forming generally refers to a process in which a material is superplastically deformed beyond its plastic deformation limits. Superplastic forming can be performed with certain materials that exhibit superplastic properties within limited ranges of temperature and an approximately constant strain rate.

Diffusion bonding generally refers to a process of joining members using heat and pressure to form a solid-state coalescence between the materials of the joined members. Joining by diffusion bonding occurs at a temperature below the melting point of the parent materials that are being joined. Coalescence between the individual parent materials is produced with pressure loads that are sufficient to urge the metallurgical microstructure to fully interface and diffuse between each other until fully joined.

The monolithic SPF/DB structure 130 may include first and second face sheets and a plurality of core sheets between the face sheets. The face sheets and the core sheets are made of material that is diffusion bondable and superplastically formable. Examples of such materials include, without limitation, grades and alloys of titanium, titanium aluminide, ceramics, glasses, ceramic metal composite, corrosion resistant steel (CRES), aluminum, metal matrix composites, and Inconel.

In some embodiments, the hybrid structure 110 may have a portion of relatively uniform thickness and a portion of reduced thickness. The built-up sandwich structure 120 may be used to form the portion having the relatively uniform thickness, and the monolithic SPF/DB structure 130 may be used to form the portion having the relatively reduced thickness. That is, the monolithic SPF/DB structure 130 is used instead of the built-up sandwich structure 120 to form the reduced thickness portion. Thus, the use of the monolithic SPF/DB structure 130 eliminates the need to pan down a metallic built-up sandwich structure and affect its structural properties.

Figure 2:
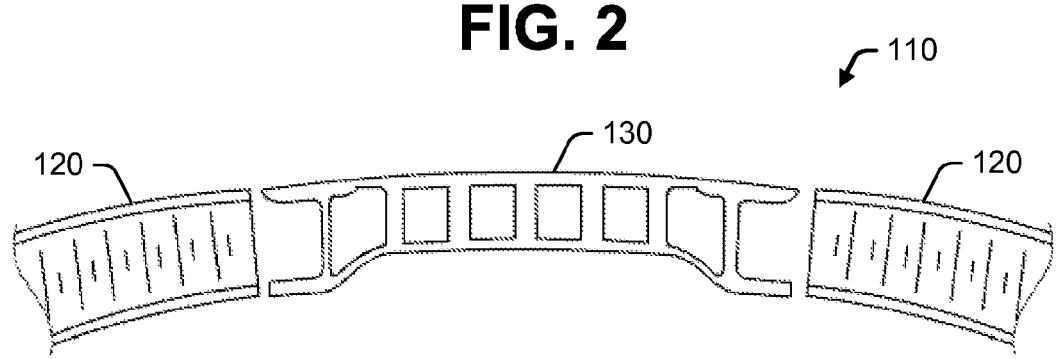
FIG. 2 is an illustration of a hybrid structure including a built-up sandwich structure and a monolithic SPF/DB structure with a reduced thickness.

FIG. 2 illustrates an example of a hybrid structure 110 having a portion of reduced thickness, which portion is generally referred to as a "pan down." The pan down is provided by a monolithic SPF/DB structure 130. Opposite sides of the SPF/DB structure 130 are joined to a built-up sandwich structure including first and second metallic built-up sandwich panels 120. The pan down also has a gentle forming radius of curvature. In addition, the pan down retains open cell space for noise treatment.

In some embodiments, the hybrid structure 110 may have a portion with a tight forming radius of curvature (e.g., a radius of curvature of about six inches or less). The metallic built-up sandwich structure 120 may be used to form a portion having a straight portion or a gentle forming radius of curvature, and the SPF/DB structure 130 may be used to form the portion having the tight forming radius of curvature. That is, the SPF/DB structure 130 is used instead of the built-up sandwich structure 120 to form the tight forming radius of curvature.

Figure 3:
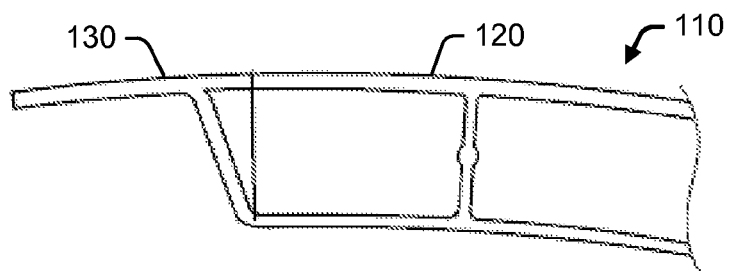
FIG. 3 is an illustration of a hybrid structure including a built-up sandwich structure and a monolithic SPF/DB structure with a tight forming radius of curvature.

FIG. 3 illustrates an example of a hybrid structure 110 including a built-up sandwich panel 120 and a "close out" for the sandwich panel 120. The close out is panned down in shape, and it has a tight forming radius of curvature. The SPF/DB structure 130 may be used to form the close out.

In some embodiments, the hybrid structure 110 may have a portion with a complex contour. The SPF/DB structure 130 may be used instead of a built-up sandwich structure 120 to provide the portion having the complex contour.

Figure 4:
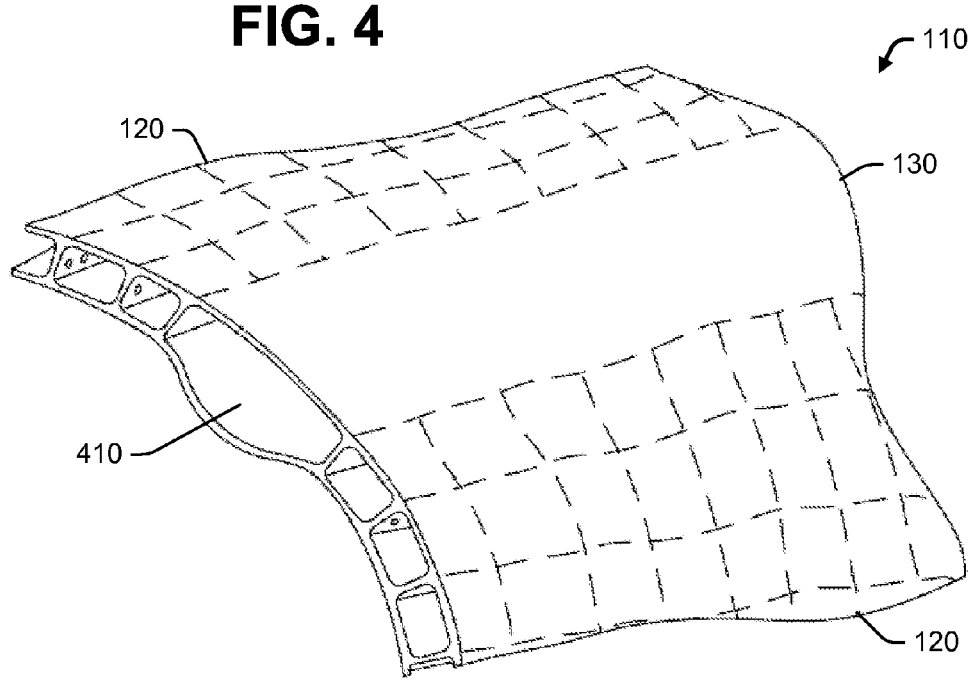
FIG. 4 is an illustration of a hybrid structure including a built-up sandwich structure and a monolithic SPF/DB structure having a complex contour.

FIG. 4 illustrates an example of a hybrid structure 110 including two built-up sandwich panels 120 that are joined to opposite sides of a monolithic SPF/DB structure 130. The monolithic SPF/DB structure 130 has a complex contour, and it forms an integral bleed air duct 410.

Reference is once again made to FIG. 1, which also illustrates a joint 140 between the built-up sandwich structure 120 and the monolithic SPF/DB structure 130. In some embodiments, the joint 140 may be formed by direct physical contact of the built-up sandwich structure 120 and the monolithic SPF/DB structure 130. For example, the joint 140 may be formed by welding (e.g., fusion butt welding), brazing, or mechanically fastening the built-up sandwich structure 120 and the monolithic SPF/DB structure 130 together.

The joint 140 may be provided with localized strengthening. One example of localized strengthening is a thickness pad up on the SPF/DB structure 130. The pad up increases the thickness at the locations where the SPF/DB structure 130 will be attached to the built-up sandwich structure 120. A pad up on the SPF/DB structure 130 has advantages over a pad up on the built-up sandwich structure 120. For instance, a pad up on a titanium built-up sandwich structure 120 might require brazing, which is not compatible with a titanium fusion welding process. In contrast, a pad up on the monolithic SPF/DB structure 130 may be formed simply by diffusion bonding additional material to the sheets of the SPF/DB structure 130.

Figure 5:
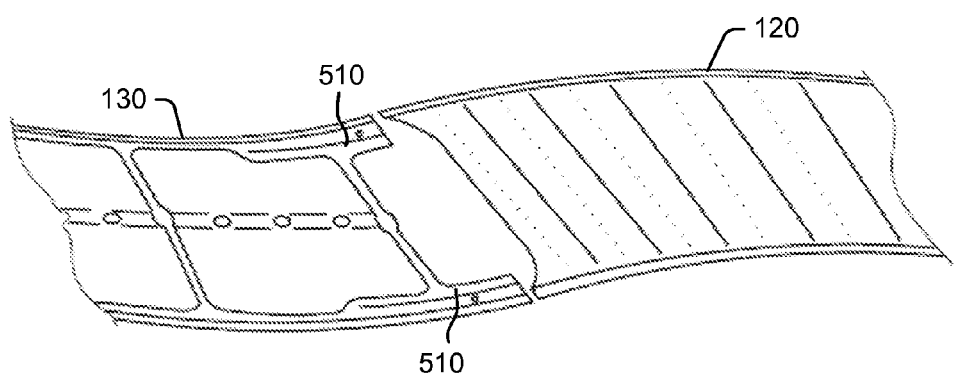
FIG. 5 is an illustration of a hybrid structure including a built-up sandwich structure and a monolithic SPF/DB structure having thickness pad ups.

FIG. 5 illustrates a hybrid structure 110 including a monolithic SPF/DB structure 130 having pad ups 510. The pad ups 510 give the SPF/DB structure 130 increased thickness at those locations where it is joined to a built-up sandwich structure 120.

As another example of localized strengthening, an intermediate part may be used to join the built-up sandwich structure 120 to the SPF/DB structure 130. Examples of the intermediate part include, but are not limited to, bar stock, a forging, sheet metal part, casting, 3-D printed component, tube, fitting, and bracket. In addition to strengthening the joint 140, an intermediate part such as a fitting can provide functionality. As but one example, the fitting can be a part of a hinge.

Figure 6A:
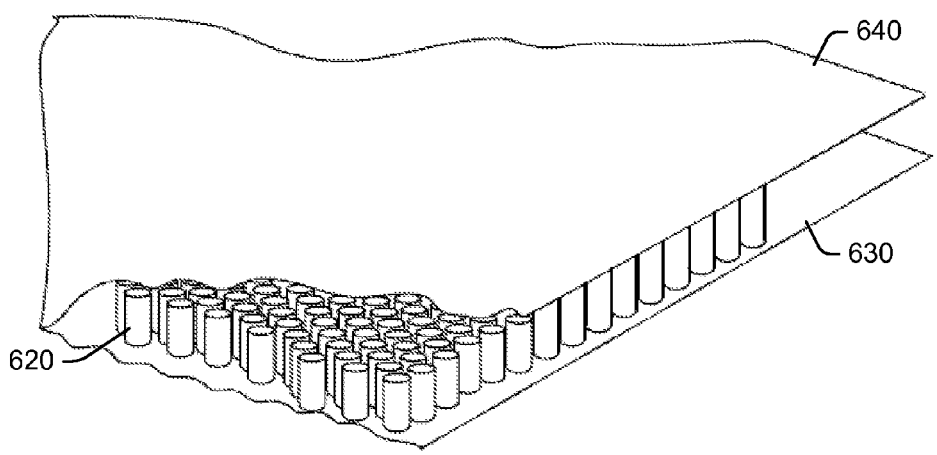
FIG. 6A is an illustration of a built-up sandwich panel.
Figure 6B:
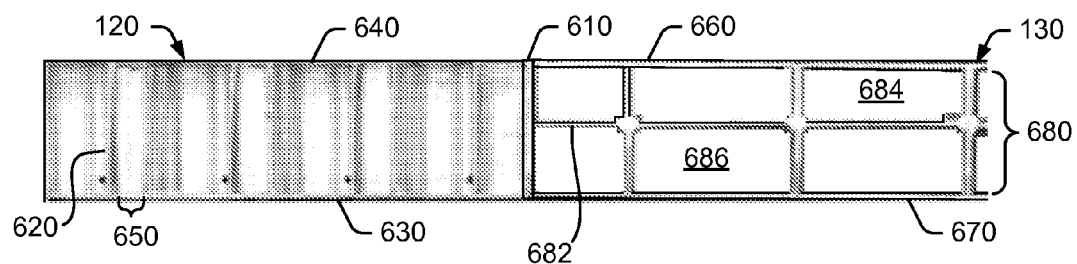
FIG. 6B is an illustration of a hybrid structure including a built-up sandwich panel joined to a monolithic SPF/DB structure by a shear strip.

FIG. 6B illustrates a hybrid structure 110 with an intermediate part that will be referred to as a "shear strip" 610. The shear strip 610 includes a columnar plate or sheet metal piece that may be welded or brazed to the SPF/DB structure 130, and also welded or brazed to top and bottom portions of the built-up sandwich structure 120.

In some embodiments, the hybrid structure 110 may be treated for passive noise attenuation. Passive noise attenuation creates out-of phase sound to cancel desired frequencies of noise without active monitoring and feedback. At least one of the SPF/DB structure 130 and the sandwich panel 120 may be treated for noise attenuation.

Consider the built-up sandwich panel 120 of FIGS. 6A and 6B. The sandwich panel 120 includes a core having a plurality of ribbons 620, and first and second face sheets 630 and 640 on opposite sides of the core. The ribbons 620 may be resistance welded, spot welded, or brazed to the face sheets 630 and 640.

If the built-up sandwich panel 120 is treated for noise attenuation, one of the face sheets (e.g., face sheet 640) may be imperforate, and the other one of the face sheets (e.g., face sheet 630) may have a plurality of openings for allowing noise and air to enter into cells 650 formed by the ribbons 620. The cells 650 are configured as a noise attenuating resonator.

Now consider the monolithic SPF/DB structure 130 of FIG. 6B. The monolithic SPF/DB structure 130 includes first and second face sheets 660 and 670, and a core 680 between the face sheets 660 and 670. The core 680 includes a septum 682, a first plurality of cells 684 between the septum 682 and the first face sheet 660, and a second plurality of cells 686 between the septum 682 and the second face sheet 670. The cells 684 and 686 are rectangular in shape.

The monolithic SPF/DB structure 130 of FIG. 6B may also be treated for noise attenuation. One of the face sheets (e.g., face sheet 660) may have openings for allowing air and noise to flow into the first plurality of cells 684. These cells 684 are configured as a noise attenuating resonator.

The septum 682 is perforated to provide a semi permeable surface that is approximately ninety degrees out of plane to the vertical standing wall structure. The septum 682 reflects and selectively transmits sound waves in a noise cancelling fashion.

Openings in the septum 682 allow air and noise to flow into the second plurality of cells 686. These cells 686 are also configured as a noise attenuating resonator.

In other embodiments, both of the face sheets 660 and 670 of the monolithic SPF/DB structure 130 may have openings for noise attenuation. Similarly, both of the face sheets 630 and 640 of the built-up sandwich panel 120 may have openings for noise attenuation.

Thus, the SPF/DB structure 130 does not only form a pan down, or a complex contour, or a tight forming radius of curvature. It may also form a portion that passively attenuates noise.

Figure 7:
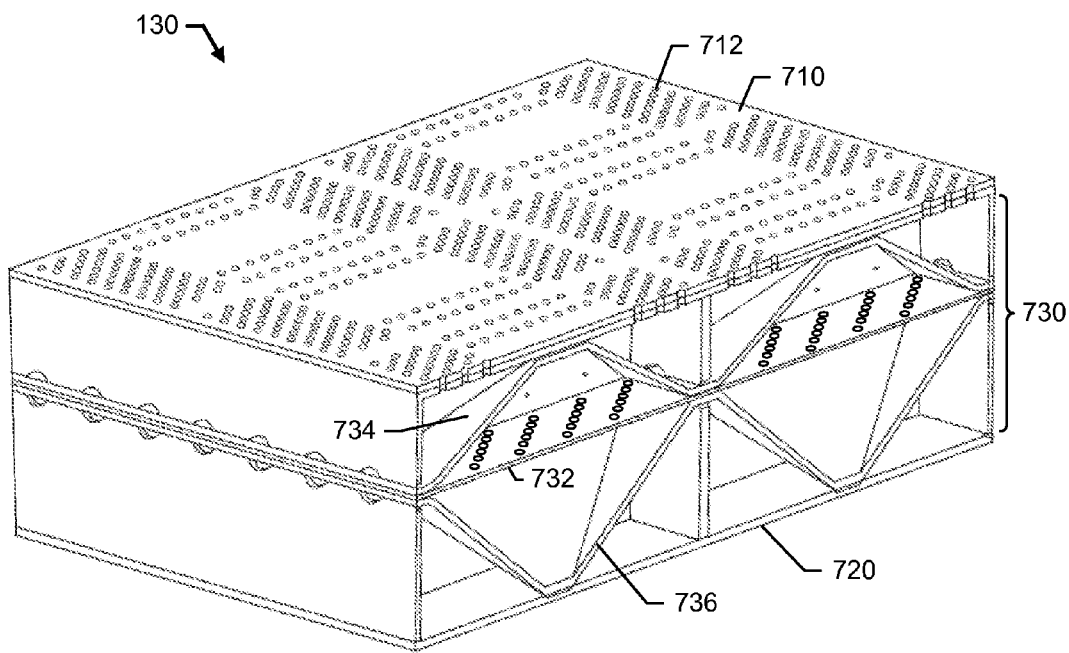
FIG. 7 is an illustration of a monolithic SPF/DB structure that is treated for noise attenuation.

FIG. 7 illustrates another example of a monolithic SPF/DB structure 130 that is treated for noise attenuation. The SPF/DB structure 130 includes first and second face sheets 710 and 720 and a sandwich core 730 between the face sheets 710 and 720. The second face sheet 720 is imperforate, and the first face sheet 710 has a plurality of openings 712 for allowing noise and air to enter into the core 730.

The core 730 includes a perforated septum 732, a first plurality of pyramid-shaped cells 734 between the perforated septum 732 and the perforated first face sheet 710, and a second plurality of pyramid-shaped cells 736 between the perforated septum 732 and the imperforate second face sheet 720. Bases of the pyramid-shaped cells 734 and 736 are formed on the perforated septum 732. Sides of the pyramid-shaped cells 734 and 736 may be perforated with openings (not shown) to provide two additional degrees of freedom for noise attenuation. Thus, the monolithic SPF/DB structure 130 of FIG. 7 may be tuned to suppress four different frequency bands. In addition to the additional degrees of freedom, the pyramid-shaped cells 734 and 736 of FIG. 7 provide higher stiffness than the rectangular-shaped cells 684 and 686 of FIG. 6B.

Examples of monolithic SPF/DB structures having pyramid-shaped cells and cells of other shapes, as well as methods of fabricating the monolithic SPF/DB structures, are described in greater detail in assignee's US Patent Publication No. 2013/0251510, published 26 Sep. 2013.

Figure 8:
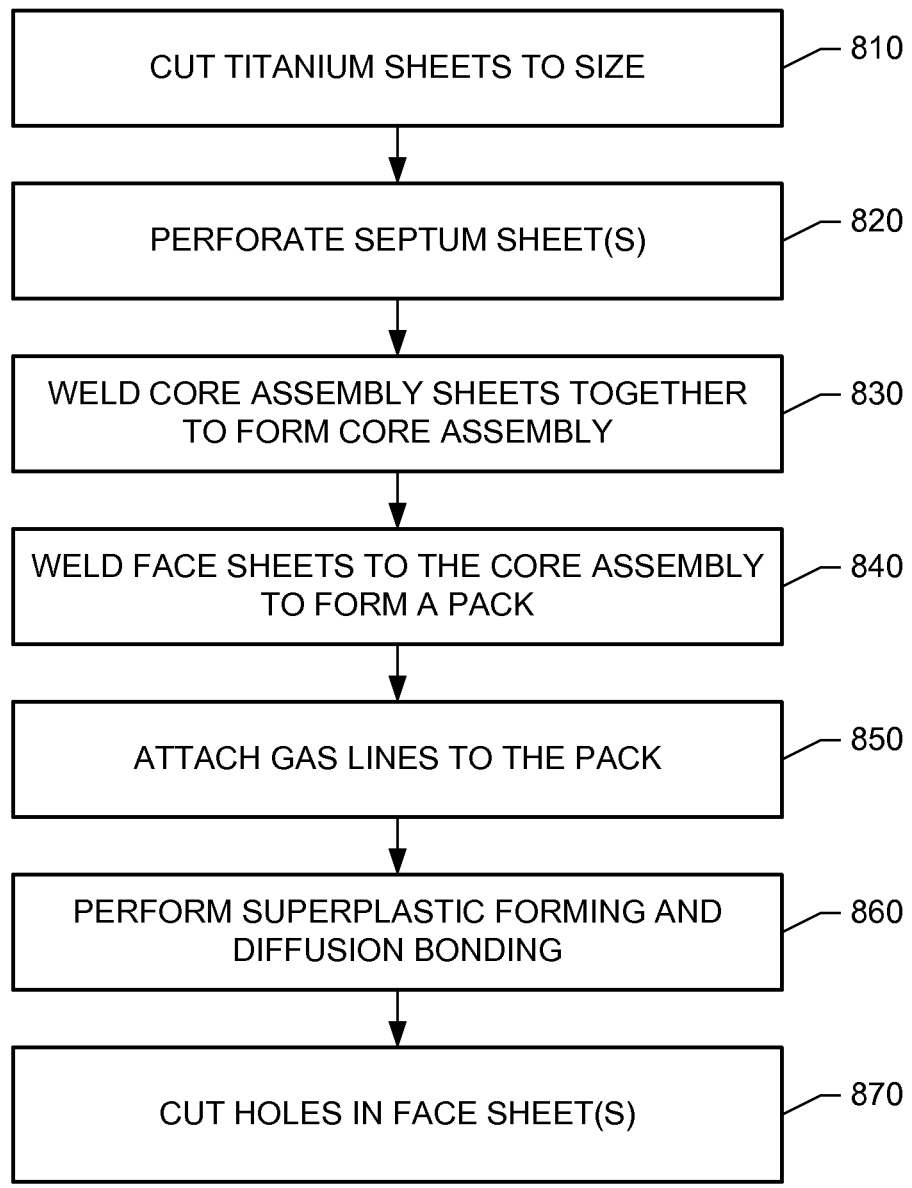
FIG. 8 is an illustration of a method of fabricating a monolithic SPF/DB structure including a septum.

Reference is made to FIG. 8, which illustrates a method of fabricating a monolithic SPF/DB structure. In this particular example, the core of the SPF/DB structure will have a perforated septum, cells above the septum, and cells below the septum.

At block 810, titanium sheets are cut to size. The titanium sheets include upper and lower face sheets, and core assembly sheets. The core assembly sheets include one or more septum sheets, one or more sheets for forming the cells above the septum, and one or more sheets for forming the cells below the septum.

At block 820, each septum sheet is perforated. At block 830, the core assembly sheets are welded together to form a core assembly. In addition to or instead of the welds, a stop-off material may be selectively provided between the core assembly sheets to prevent certain portions of the adjacent surfaces of the core assembly sheets from being bonded together.

At block 840, the face sheets are welded to the core assembly to form a pack. The perimeter of the pack may be hermetically sealed.

At block 850, gas lines are attached onto the pack. Some of the gas lines will enable a first pressure to be applied inside the core assembly during superplastic forming and diffusion bonding. Some of the other gas lines will enable a second pressure to be applied outside of the core assembly during superplastic forming and diffusion bonding.

At block 860, superplastic forming and diffusion bonding is performed. The pack is purged to eliminate air between the sheets, filled with an inert gas such as argon, and placed in a cavity of a forming die. The pack is heated and the die is closed. Thereafter, the pack is pressurized via the gas lines to inflate the pack and thereby form the pack.

At block 870, openings are cut (e.g., drilled) through desired face sheets. The openings allow air and noise to enter into the cells.

A structure herein is not limited to any particular application. Several examples will not be discussed.

A first example is illustrated in FIG. 4. The structure of FIG. 4 may be used as an integrated fan bleed duct. Jet air exhaust is supplied to the duct 410 formed by the SPF/DB structure 130. The jet air exhaust is mixed with ambient air to reduce the temperature of the jet air exhaust. The hybrid structure 110 of FIG. 4 may or may not be treated for noise attenuation.

Figure 9:
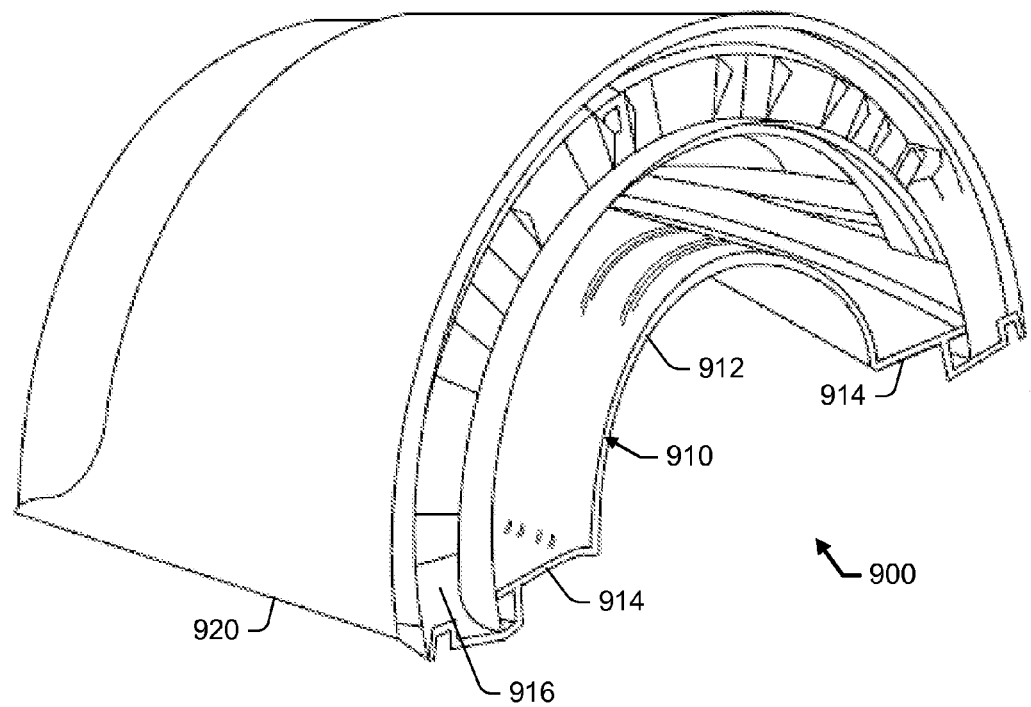
FIG. 9 is an illustration of an engine nacelle section including a fan duct.

A second example is illustrated in FIG. 9. FIG. 9 illustrates a section of a nacelle 900 for a turbofan jet engine. The nacelle 900 includes a fan duct 910, and a cowling 920 that covers the fan duct 910. During operation of the jet engine, intake air flows through the engine's core (the "core flow") and another portion (the "bypass flow" or "fan flow") flows through the fan duct 910. The fan duct 910 has an inner wall 912, which separates the bypass flow from the core flow. The inner wall 912 functions as a core duct for the core flow, and it may also function as a cowling for the engine core. Bifurcations 914 attach the inner wall 912 to the cowling 920. The nacelle 900 may further include a thrust reverser deflector 916.

The inner wall 912 may include curved titanium built-up sandwich panels that are joined together by monolithic SPF/DB structures. The titanium sandwich panels may be treated for noise attenuation. Inner face sheets of the titanium panels (that is, face sheets exposed to flow around the engine core) may be perforated to allow noise and air to flow into cells configured as a noise resonator. Outer face sheets of the titanium sandwich panels (that is, face sheets exposed to the bypass flow) may also be perforated that allow noise and air to flow into the cells.

The SPF/DB structures accommodate the bifurcations 914. The bifurcations 914 may also be treated for noise attenuation. In some embodiments, the bifurcations 914 may be formed by the SPF/DB structures. In other embodiments, the SPF/DB structures form attachment points for the bifurcations 914, which may be titanium sandwich panels that are joined to the SPF/DB structures.

Figures 10, 11, 12:
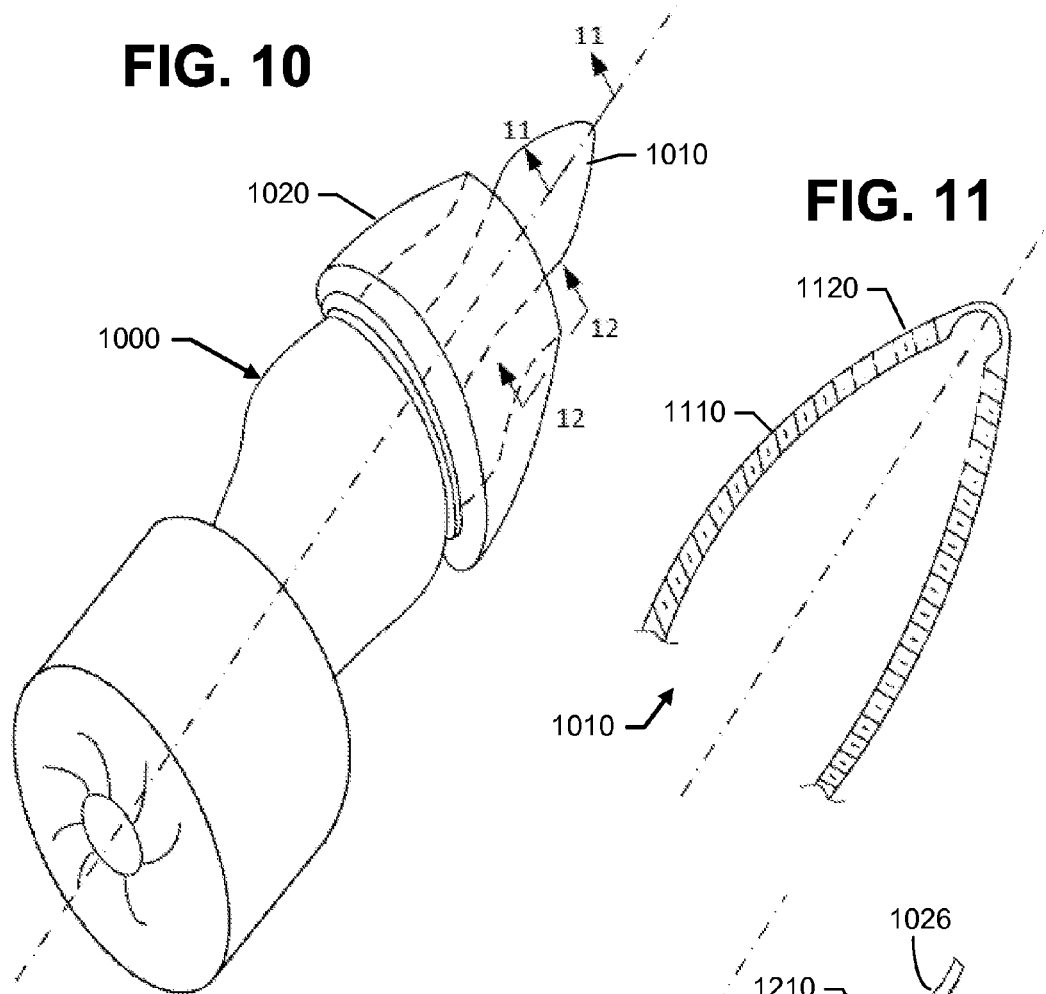
FIG. 10 is an illustration of a jet engine including a nozzle and an engine plug.
FIG. 11 illustrates a cross-section of the engine plug of FIG. 10.
FIG. 12 illustrates a cross-section of the nozzle of FIG. 10.

Third and fourth examples are illustrated in FIG. 10. The third example is a plug 1010 for a jet engine 1000, and the fourth example is a nozzle 1020 for the jet engine 1000.

A cross-section of the plug 1010, taken along lines 11-11 is illustrated in FIG. 11. A built-up sandwich panel 1110 forms an annular portion of the plug 1010. A monolithic SPF/DB structure 1120 forms a conical portion of the plug 1010. The plug 1010 may be perforated on its exterior and/or interior surface for noise attenuation.

A cross-section of the nozzle 1020, taken along lines 12-12 is illustrated in FIG. 12. The nozzle 1020 has a convergent section 1022, throat 1024, and divergent section 1026. The divergent section 1026, the throat 1024 and an adjacent portion of the convergent section 1022 is formed by a monolithic SPF/DB structure 1210. A remaining portion of the convergent section 1022 is formed by a built-up sandwich structure 1220. Inner and outer walls of the monolithic SPF/DB structure 1210 and the built-up sandwich structure 1220 may be perforated for noise attenuation. An outer shell 1230 surrounds the convergent section 1022, the throat 1024, and the divergent section.

Although a nozzle 1020 for a jet engine 1000 is illustrated, a nozzle herein is not limited to a jet engine. For example, a nozzle herein may be configured for a rocket, missile, or hypersonic vehicle.

The structures illustrated in FIGS. 4, 9 and 10 operate in extreme temperature environments. Materials for these structures include titanium, CRES, Inconel, and metal matrix composites.

A hybrid structure herein is not limited to aerospace applications. Examples of non-aerospace applications include, but are not limited to, heat shields, mufflers and noise attenuators for automobiles, trains, trucks, motorcycles (for high performance exhaust), race cars, boats, and ships. Other examples include electrical generation turbines, gun and cannon silencers, and devices powered by small gas or diesel engines.

The invention claimed is:

1. A hybrid structure comprising:
   a metallic built-up sandwich structure; and
   a monolithic superplastic formed and diffusion bonded (SPF/DB) structure joined to the built-up sandwich structure, wherein at least a non-joining portion of the SPF/DB structure has a reduced thickness relative to the built-up sandwich structure.

2. The hybrid structure of claim 1, wherein the SPF/DB structure has a complex contour.

3. The hybrid structure of claim 1, wherein the SPF/DB structure has a forming radius of curvature of less than six inches.

4. The hybrid structure of claim 1, wherein the built-up sandwich structure and the SPF/DB structure are joined by direct physical contact.

5. The hybrid structure of claim 1, wherein a joint between the built-up sandwich structure and the SPF/DB structure has localized strengthening.

6. The hybrid structure of claim 5, wherein the localized strengthening includes a thickness pad up of the SPF/DB structure.

7. The hybrid structure of claim 5, wherein the localized strengthening includes a shear strip joining the SPF/DB structure to the built-up sandwich structure.

8. The hybrid structure of claim 1, wherein the built-up sandwich structure includes first and second face sheets and a core of metallic ribbons joined between the face sheets.

9. The hybrid structure of claim 1, wherein at least one of the SPF/DB structure and the built-up sandwich structure is treated for noise attenuation.

10. The hybrid structure of claim 9, wherein the SPF/DB structure includes face sheets and a core that forms cells; and wherein at least one of the face sheets has a plurality of openings for allowing noise and air to enter into the cells.

11. The hybrid structure of claim 10, wherein the core includes a perforated septum.

12. The hybrid structure of claim 10, wherein cells are pyramid-shaped.

13. The structure of claim 1, wherein the built-up sandwich structure and the SPF/DB structure form an inner wall of an engine nacelle fan duct; wherein face sheets of the built-up sandwich structure have a plurality of openings for noise attenuation; and wherein the SPF/DB structure accommodates bifurcations.

14. The structure of claim 1, wherein the built-up sandwich structure and the SPF/DB structure are configured as a bleed air duct.

15. The structure of claim 1, wherein the built-up sandwich structure forms an annular portion of an engine plug, and wherein the SPF/DB structure forms a conical portion of the engine plug.

16. The structure of claim 1, wherein the built-up sandwich structure forms a convergent portion of a nozzle, and wherein the SPF/DB structure forms a throat and divergent section of the nozzle.

17. An engine nacelle fan duct comprising an inner wall including a metallic built-up sandwich structure joined by a monolithic SPF/DB structure, wherein at least a non-joining portion of the SPF/DB structure has a reduced thickness relative to the built-up sandwich structure and the SPF/DB structure accommodating a bifurcation.

18. A method of constructing a hybrid structure, the method comprising:
   forming a monolithic SPF/DB structure;
   joining the SPF/DB structure to a metallic built-up sandwich structure; and
   reducing a thickness of at least a non-joining portion of the SPF/DB structure relative to the built-up sandwich structure.

* * * * *